United States Patent [19]
Plummer et al.

[11] 3,761,179
[45] Sept. 25, 1973

[54] MIRROR TESTING APPARATUS

[75] Inventors: William T. Plummer, Concord; Udo W. Salomon, Peabody; Lawrence K. Ting, Arlington, all of Mass.

[73] Assignee: Polaroid Corporation, Cambridge, Mass.

[22] Filed: Aug. 26, 1971

[21] Appl. No.: 175,274

[52] U.S. Cl. ................ 356/120, 356/124, 356/211, 356/212
[51] Int. Cl. ........................................... G01b 11/30
[58] Field of Search ................... 356/152, 120, 124, 356/153, 209–211

[56] References Cited
UNITED STATES PATENTS

| | | | |
|---|---|---|---|
| 3,663,107 | 5/1972 | Denis et al. | 356/209 |
| 2,623,927 | 12/1952 | Germans | 356/152 |
| 2,446,628 | 8/1948 | Brown | 356/120 |
| 3,606,541 | 9/1971 | Sugano et al. | 356/120 |
| 2,315,282 | 3/1943 | Snow | 356/210 |
| 2,720,812 | 10/1955 | Middleton | 356/209 |
| 3,439,988 | 4/1969 | Breske | 356/120 |
| 2,604,809 | 7/1952 | Mitchell | 356/120 |

*Primary Examiner*—Ronald L. Wibert
*Assistant Examiner*—F. L. Evans
*Attorney*—Charles Mikulka et al.

[57] ABSTRACT

An apparatus automatically measures the reflecting surface of a mirror to evaluate its local flatness and its overall flatness. In one embodiment of the apparatus, two separate optical systems are arranged so a mirror under test forms a part of each optical system. One optical system forms a large beam of light which covers the entire surface of the mirror. The other optical system forms a small beam of light which covers only a small local area of the mirror, but it includes a device which sweeps the small beam over the entire surface of the mirror. Overall or local variations in flatness of the surface result in proportional variations of light intensity at detectors associated with each optical system. Electronic circuitry processes signals generated by the detector to decide if the signals indicate the surface of the mirror under test is within predetermined limits.

14 Claims, 7 Drawing Figures

INVENTORS
WILLIAM T. PLUMMER
UDO W. SALOMON
LAWRENCE K. TING

BY *Brown and Mikulka*
and
*Frederick H. Brustman*
ATTORNEYS

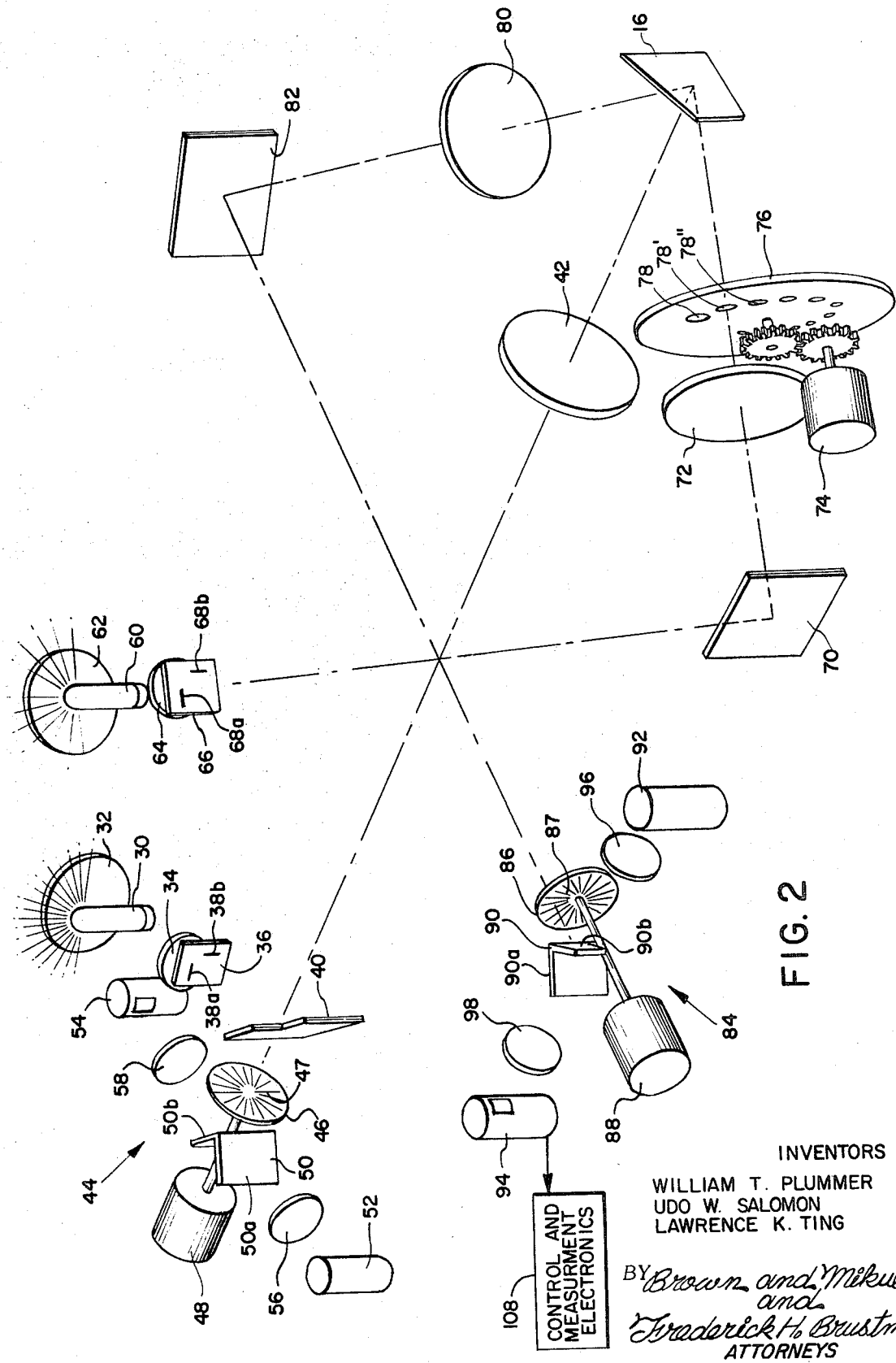

INVENTORS
WILLIAM T. PLUMMER
UDO W. SALOMON
LAWRENCE K. TING

ATTORNEYS

3,761,179

MIRROR TESTING APPARATUS

BACKGROUND OF THE INVENTION

The present invention is an apparatus and method particularly useful for measuring the flatness of an optical mirror. It is especially suited for measuring large quantities of mirrors quickly and economically.

Previously known techniques for measuring the flatness of a surface are not feasible for measuring large quantities of mirrors. They generally require contact between a mirror and a reference surface or a probe, thereby imposing strict standards of care on an operator to prevent damage to the surface of the mirror. Typical of methods using a reference surface are optical interference and moire fringes. Both methods yield contour line patterns, indicative of the flatness of a test surface, an operator must visually evaluate. Flatness measuring machines generally move a contact probe over the test surface to trace its contours. They are generally guite slow because of the time required to trace a useful number of contours.

The previously known ways to measure the flatness of a mirror are acceptable when only a few surfaces are to be measured or where optical grinding and polishing techniques are employed to manufacture the mirror surface. Normal (mechanical) optical grinding and polishing techniques result in a very high degree of uniformity from piece to piece. Thus, quality control measurements of mechanically ground and polished surfaces can be reliably based upon known statistical sampling methods. Since only a relatively few surfaces need actually be measured, time-consuming measuring methods are tolerated.

A mirror, to be produced in very large quantities, for use in a certain optical system has flatness tolerances on its reflecting surface that would be satisfied by perhaps eighty percent of pieces randomly cut from a standard sheet of commercial glass, i.e., drawn and fire-polished glass. A mirror manufactured in large quantities directly from fire-polished glass is far more economical than a comparable mirror manufactured from mechanically-polished glass, even allowing for an acceptance rate of only eighty percent for the former. However, successfully using fire-polished glass for optical mirrors requires that every piece must be measured for flatness. The cost of measuring each fire-polished piece by previously known methods, so as to select only the acceptable ones, is prohibitive.

An object of the present invention is to provide a rapid method for measuring the flatness of many mirror surfaces, one suitable for performance and evaluation by a machine.

Another object of the present invention is to provide a machine or apparatus which will optically measure a mirror surface for flatness and astigmatism across the entire area of the reflecting surface and also at small local areas on the surface.

Other objects of the invention will in part be obvious and will in part appear hereinafter.

SUMMARY OF THE INVENTION

These and other objects of the invention are accomplished by an apparatus having two separate image-forming optical systems. A mirror that is to be tested is placed in a receiving station of the apparatus which orients the mirror so it forms a part of both optical systems. In each optical system, a projection lamp and condenser illuminate a pair of orthogonal slits in an otherwise opaque source plate. Orthogonal slits allow the measurement of astigmatism in the surface of the mirror.

One of the optical systems (the overall curvature tester) uses a telescope objective lens to collimate the light emanating from the source plate into a beam with a cross-section equal to the useful aperture of the mirror. The mirror reflects the beam back to the telescope objective which refracts the light beam into an image of the source plate slits on a corresponding pair of slits in a target plate. Light incident on the target plate slits is transmitted through them to a second condenser which refracts it to a photomultiplier. Any variation of the surface of the mirror from true flatness results in a blurring of the image and a reduction of light intensity ($watts/cm^2$) at the target plate. Because the target plate slits have a fixed size, the decrease of intensity reduces the energy transmitted by the slits to the photomultiplier which readily detects the change.

The other optical system (the zone tester) utilizes a similar arrangement of slits, photomultiplier, etc., to form another beam of light with a cross-section equal to the useful aperture of the mirror, except two similar telescope objectives are used with the mirror reflecting a collimated beam of light from one to the other. However, a Nipkow scanning disk obstructs the collimated beam, restricting the size of the cross-section of the light beam reaching the mirror to a small fraction of the useful aperture of the mirror. The Nipkow scanning disk causes the smaller light beam to scan the mirror; thus, the signals generated by the associated photomultiplier at any instant relate only to the portion of the mirror illuminated by the restricted light beam at that instant.

The apparatus incorporating both of these optical systems can measure the overall curvature of the entire mirror and can also measure the curvature of local zones or sections of the mirror. It is desirable, for signal processing purposes, that the photomultiplier emit a varying (AC) signal. To this end, the target plates comprise rotating disks with a plurality of radial slits which regularly chop the light to the photomultiplier.

The signals generated by the photomultipliers are processed by electronic circuitry to determine if they are within predetermined limits established with reference to signals generated by mirrors having acceptable overall and local flatness. Mirrors which cause signals without the predetermined limits are rejected.

The apparatus embodying the concepts of this invention can be adapted to test mirrors brought to it by automatic transfer machinery and to mark or remove unacceptable mirrors.

The invention accordingly comprises several steps and the relation and order of one or more of such steps with respect to each of the others and the apparatus possessing the construction, combination of elements and arrangement of parts which are exemplified in the following detailed disclosure, and the scope of the application of which will be indicated in the claims.

DESCRIPTION OF THE DRAWINGS

For a fuller understanding of the nature and objects of the invention, reference should be had to the following detailed description taken in connection with the accompanying drawings wherein:

FIG. 2 schematically illustrates the two optical systems within the apparatus;

DESCRIPTION OF THE PREFERRED EMBODIMENT

Figure 1:
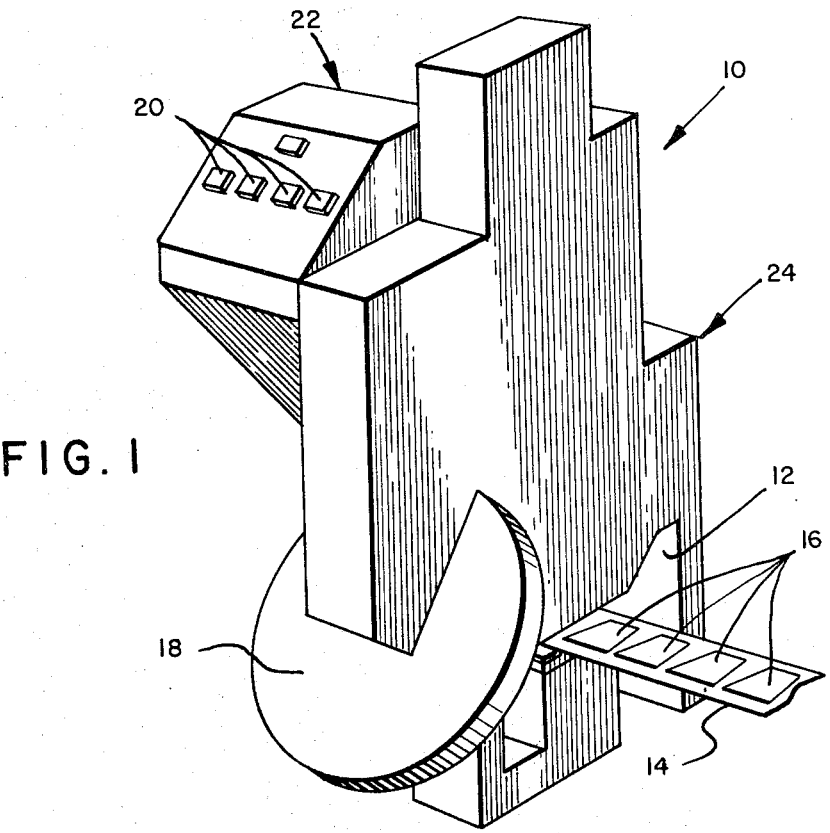
FIG. 1 illustrates the exterior appearance of the apparatus and its control console together with a transfer mechanism for positioning mirrors at the test station.

The elements of an apparatus for automatically testing the flatness of mirror surfaces in large quantities are shown in FIG. 1. The testing apparatus 10 has a receiving station 12 for holding a mirror 16 during its test. A conveyer 14 delivers a plurality of mirrors 16 to the receiving station 12 for testing by the apparatus 10. A drum 18 encloses a Nipkow disk scanning device described below. The indicator devices 20 on a console 22 signal when the apparatus 10 has determined that a mirror is unacceptable. Electronic circuitry for evaluating the measurements made by the testing apparatus 10 are enclosed in the console 22. A lighttight housing 24 encloses the testing apparatus 10 to prevent ambient light from causing spurious measurements.

Figure 2A:
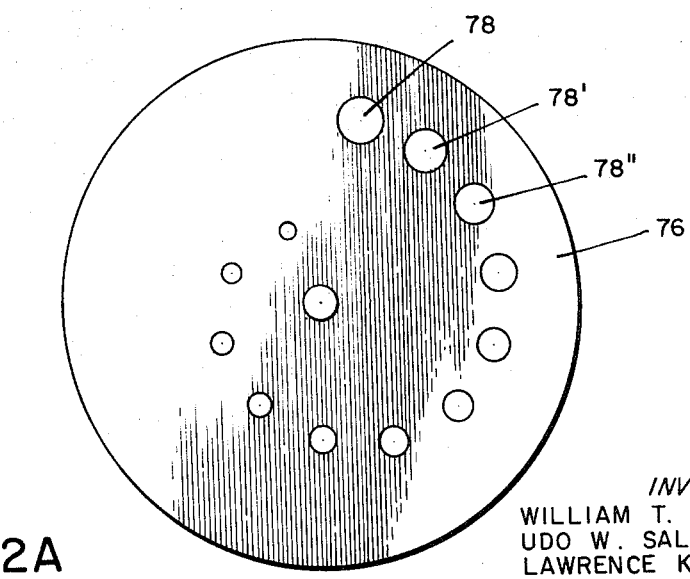
FIG. 2a illustrates in greater detail one element of the apparatus of FIG. 2.

The two optical systems contained within the housing 24 are shown schematically in FIG. 2. One optical system measures the overall curvature or bow of the mirror. The other optical system measures the zonal flatness or local power of the mirror. In the present embodiment of the apparatus 10, both optical systems situate in the housing 24 examine the mirror 16 simultaneously.

The system for measuring the overall flatness or bow uses an incandescent lamp 30 as a source of light. The incandescent lamp 30 is used because variations in the power supplied to the lamp 30 will have a minimal effect on the actual light emitted by it. A spherical mirror 32, spaced behind the incandescent lamp 30 a distance equal to twice its focal length, reflects back the light incident on it, thereby effectively doubling the light incident on a condenser lens 34. The condenser lens 34, separated from the lamp 30 by a distance equal to its focal length, refracts the light into a collimated beam and uniformly distributes it on the back of a source plate 36.

A pair of orthogonal slits 38a and 38b transmit some of the light incident on the back of the source plate through it. The orthogonal slits 38a and 38b permit the apparatus 10 to independently measure flatness variations in orthogonal directions. Such capability is particularly useful when a mirror can successfully serve its function with asymmetric flatness tolerances. In cases where asymmetric flatness variations are of no concern, a simple pinhole aperture can be substituted for the pair of slits 38a and 38b.

A notched mirror 40 reflects the light emerging from the slits 38a and 38b to a large diameter telescope objective lens 42. The notched mirror 40 obliquely intersects the axis of the telescope objective 40 so as to direct the light from the slits 38a and 38b along that axis. The notched portion allows light from the telescope objective 42 to reach a detector (described below) located along the axis, but beyond the notched mirror 40.

A beam splitting mirror can be used instead of the notched mirror 40, but it would use the variable light inefficiently.

The telescope objective 42, spaced an optical distance equal to its focal length from the slits 38a and 38b, collimates the light from the slits 38a and 38b into a parallel beam with a diameter at least as large as a diagonal of the mirror 16. It will be appreciated that the telescope objective 40 needs a useful aperture with a diameter at least as great as the diagonal. The mirror 16, positioned by the mechanism of the receiving station 12 (not shown in FIG. 2) in the parallel beam formed by the telescope objective 42, reflects the beam back on itself through the telescope objective 42 and past the notched mirror 40 to a detecting station 44 including a chopper wheel 46 spaced from the objective 42 a distance equal to its focal length. The telescope objective forms an image of the slits 38a and 38b on the chopper wheel 46.

The chopper wheel 46 serves as a target plate. Driven by a motor 48, it rotates a set of radial receiving slits 47 through the images of the slits 38a and 38b formed by the telescope objective 42 alternately transmitting and blocking the light in the slit images so as to impose a varying (AC) component on the signal generated by the detecting station 44. The number of slits used in the chopper wheel 46 depends upon the tolerances expected of the mirror 16. Testing for small tolerances on the flatness of the mirror 16 requires high chopping frequencies; increasing either the number of slits or the angular velocity of the chopper wheel 46 or both will increase the chopping frequency.

A right angle mirror 50 reflects light from the slit images transmitted by the chopper wheel 46 to photomultipliers 52 and 54. It is arranged behind the chopper wheel 46 so one specular face 50a reflects the light from the horizontal slit image through a field lens 56 to the photomultiplier 52. The other specular face 50b reflects the light from the vertical slit image through another field lens 58 to the photomultiplier 54. One function of the field lenses 56 and 58 is to collect all the light from their respective slit images and to uniformly distribute it over the photosensitive areas of their respective photomultipliers 52 and 54. Each photomultiplier sends its signals to the electronic circuitry (discussed below) for evaluation.

In the present optical arrangement, the detector station 44 is insensitive to errors in mirror 16 that change the length of the slit images, but is quite sensitive to errors that change the width of the slit images at the chopper wheel 46. Changes in the length of a slit image do not prevent all the light from passing through the radial slits 47 in the chopper wheel 46 because they are much longer than the normal slit image. However, changes in the width of a slit image do prevent the light from passing through a radial slit 47 all at once because the radial slits 47 are substantially the same width as the normal slit image (a more detailed discussion of this is set forth below).

Therefore, the signals generated by each photomultiplier 52, 54 relate to the curvature of the mirror 16 in only one direction. The photomultiplier 52 receiving the image of the horizontal slit 38a monitors the mirror 16 for curvature in a direction orthogonal to the slit 38a (i.e., vertical). Likewise, the photomultiplier 54 receiving the image of the vertical slit 38b monitors the mirror 16 for curvature in a direction orthogonal to the slit 38b (i.e., horizontal). As noted above, this arrangement increases the versatility of the measuring apparatus 10 because it permits the use of orientation dependent flatness standards for the surface of the mirror 16; i.e., the system distinguishes between horizontal and vertical curvatures.

The optical system for measuring the zonal flatness or local power of the mirror 16 comprises similar components arranged in a different configuration. The different configuration permits it to examine the mirror 16 simultaneously with the other optical system while mirror 16 remains at the receiving station 12.

An incandescent lamp 60 together with a spherical mirror 62 and a condenser lens 64 uniformly illuminates the back of a source plate 66. A first folding mirror 70 reflects light transmitted by a pair of orthogonal slits 68a and 68b in the source plate 66 to a large telescope objective 72. The telescope objective 72 has a clear aperture large enough to form a collimated light beam that fills the entire mirror 16. A scanning mechanism employing a motor 74 to rotate a Nipkow scanning disk 76 is situated between the telescope objective 72 and the mirror 16.

The Nipkow disk 76 obstructs the passage of light from the telescope objective 72 to the mirror 16 except for light passing through a set of apertures 78 arranged in a spiral on the Nipkow disk 76. Each aperture 78 is at a different radial distance than the others (see FIG. 2a). As the Nipkow disk 76 rotates, it sweeps successive apertures 78 through the light beam transmitting a portion of the light beam and thereby illuminating the surface of the mirror 16. Locating the apertures 78, 78', 78'', etc., at different radial distances from the center of the Nipkow disk 76, causes the light passing through them to illuminate different zonal bands spaced across the surface of the mirror 16 according to the radius of the aperture. It will now be understood that the apertures 78 can be prearranged on the Nipkow disk 76 so as to successively illuminate every zone on the surface of the mirror 16. Further, by preselecting the size of each aperture, different measurement sensitivity (dioptric power per unit area) can be employed at various zones on the surface of the mirror 16. Synchronizing means (not shown) on the Nipkow disk 76 signals the electronic signal processing circuitry when an aperture 78 in the Nipkow disk 76 illuminates the mirror 16. It prevents spurious negative indications by the electronic signal processing circuitry when the beam sweeps off the mirror 16. The synchronizing means can also indicate which aperture is scanning the mirror 16. The Nipkow disk 76 is used to scan the mirror 16 because the final image formed by the optical system remains stationary and does not waver due to the scanning action.

The mirror 16 reflects the light transmitted to it by the Nipkow disk 76 to another telescope objective 80 having a clear aperture at least as large as that of the telescope objective 72. The telescope objective 80 refracts the light from the mirror 16 into an image of the slits 68a and 68b which a second folding mirror 82 reflects to a detecting station 84 where the image is incident on a chopper wheel 86 having a set of radial slits 87. The slits 68a and 68b are preferably arranged so the intersection of center lines through their images is coincident with the rotational axis of the chopper wheel 86. The slits 38a and 38b are arranged to effect a similar rotation between their images and the axis of the chopper wheel 46.

The detecting station 84 comprises the chopper wheel 86 rotated by a motor 88, a right angle mirror 90, two photomultipliers 92 and 94, and field lenses 96 and 98. The arrangement and functions of the components in the detecting station 84 are substantially the same as those of the previously described detecting station 44. The mirror face 90a reflects the image of the horizontal slit 68a, after transmission of the image through the chopper wheel 86, through the condenser lens 98 to the photomultiplier 94, and the mirror face 90b reflects the image of the vertical slit 68b through the condenser lens 96 to the photomultiplier 92. The rotation of the chopper wheel 86 causes the detecting station 84 to generate signals with an AC component.

For the same reasons explained above with regard to detecting station 44, each photomultiplier 92, 94 generates a signal related to the curvature of the mirror 16 in separate directions. Further, the signals generated relate only to the flatness of the specific zone of the mirror 16 illuminated by the Nipkow disk 76 at that instant.

Figure 3A:
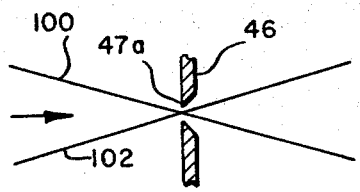
FIGS. 3a, 3b, and 3c illustrate the formation of a source slit image at a target slit.

Each of the optical systems forms an image of its respective source slits on its respective chopper wheel. Reference should be had to FIG. 3a which shows an enlarged detail of a slit 47 in the chopper wheel 46. The optical system of the system for measuring overall curvature forms an image of the slits 38a and 38b at the chopper wheel 46. Light rays 100 and 102 delineate the extremities of the converging beam of light refracted by the telescope objective 42 to form the slit image at the chopper wheel 46. FIG. 3a represents the case when the mirror 16 under test is perfectly flat; thus, the optical system forms a slit image (represented by the intersection of rays 100 and 102) exactly at the surface of the chopper wheel 46 resulting in a maximum light intensity (watts/cm$^2$).

Figure 3B:
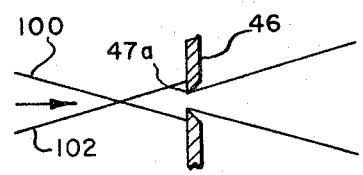
Figure 3C:
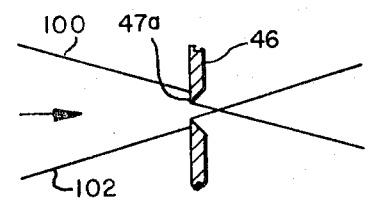

FIG. 3b illustrates the situation when the mirror 16 is slightly concave; the slit image blurs, spreading out on the chopper wheel 46 and, consequently, results in less than the maximum light intensity. FIG. 3c illustrates the situation when the mirror 16 is slightly convex; the slit image again blurs, spreading out on the chopper wheel 46, and also results in less than the maximum light intensity.

As the chopper wheel 46 rotates, the light within the cone defined by rays 100 and 102 will pass through the slit 47 and reach a photomultiplier. When the test mirror 16 is perfect or nearly so, the image is sharpest and the slit 47 passes through almost instantly; whereas when the test mirror 16 is either concave or convex, the slit image blurs and the slit 47 takes longer to pass through it. Greater concavity or convexity of the mirror 16 increases the blurring of the image, causing a corresponding increase in the passage time of the slit 47 through the slit image. Those skilled in the art will now appreciate that mirrors with other moderate defects within the range of interest besides simple curvatures, e.g., S-curves or ripples, also blur the slit image on the chopper wheel 46.

The integrated product (energy) of the passage time and the intensity of the image (assuming a constant flux) on the chopper wheel 46 remains constant regardless of the flatness of the mirror 16. During the time the slit 47 passes through the slit image, all the light in the slit image, blurred or otherwise, impinges on a photomultiplier that emits electrical signals proportional to the light incident at any instant. Thus, the magnitude of the DC signal level (that is, the energy divided by the time interval between peaks during the passage time) is constant and depends only on the presence of the mirror 16, whereas the magnitude of the varying (AC) signal (that is, the difference between the maximum and the minimum signal level) varies and depends inversely on the flatness of the mirror 16. Flat mirrors maximize the magnitude of the varying (AC) signal while curved mirrors reduce it and badly curved mirrors reduce it greatly. The preceding explanation applies equally to both the overall optical system and the zonal optical system with its scanning mechanism as well as to either vertical and horizontal slits when used for astigmatism sensitive measurements or a pinhole aperture.

The ratio of the AC signal to the DC signal indicates the relative flatness of a specific mirror. This ratio of the AC to DC signals relates in a simple manner to the optical contrast in an image formed by a photographic reflex camera which uses the tested mirror in its optical system.

The electronic circuitry of the testing apparatus 10 includes a circuit to compare the AC signal to the DC signal and indicate when the ratio is unacceptably low. The testing apparatus 10 normally functions so an indication is made only when a mirror under test is unacceptable for its intended use.

THE CONTROL SYSTEM

Figure 4:
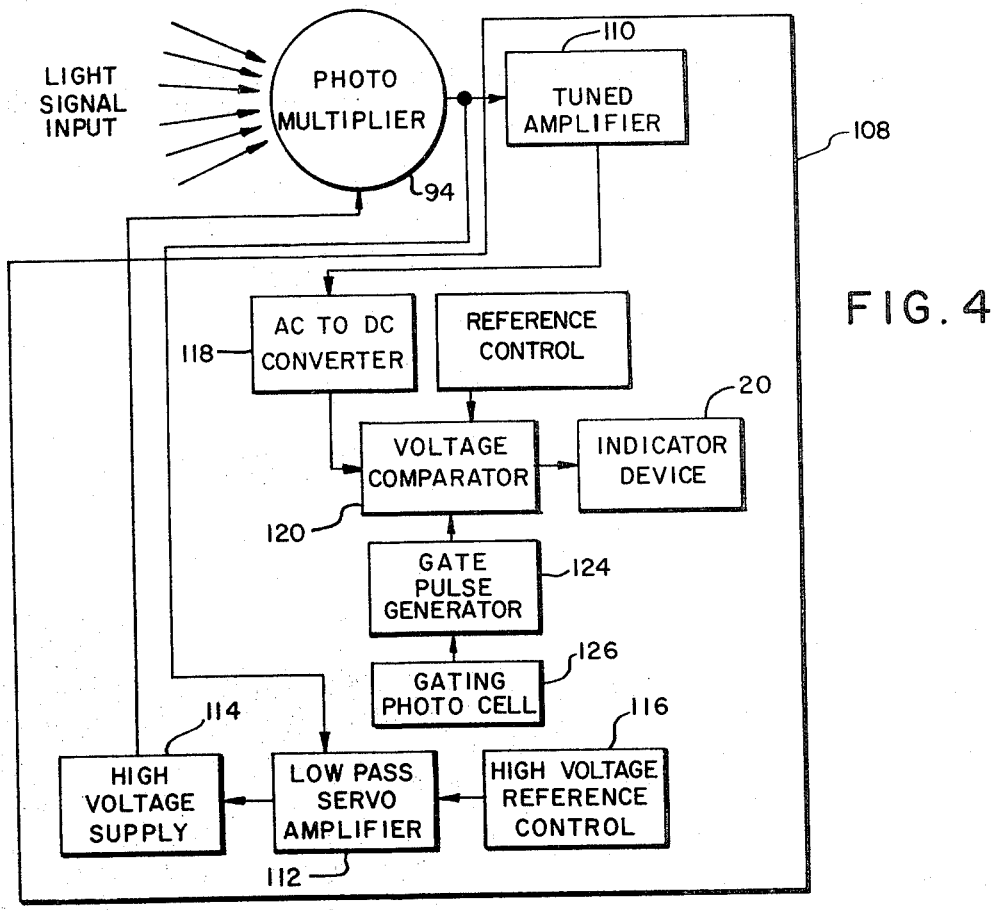
FIG. 4 shows a block diagram of one portion of the control circuitry.

Reference should be had to FIG. 4 which shows a block diagram of the Control and Measurement Electronics 108, together with the photomultiplier 94, for monitoring the image of the horizontal source slit 68a. The Control and Measurement Electronics 108 includes a Low Pass Servo Amplifier 112, a High-Voltage Supply 114, and a High-Voltage Reference Control 116 arranged, as explained below, to maintain an average signal from the photomultiplier 94. In addition, the Control and Measurement Electronics 108 also includes a Tuned Amplifier 110 connected to an AC to DC Converter 118, and a Voltage Comparator 120 that is connected to both the AC to DC Converter 118 and to a Reference Control 122 and that operates the Indicator Device 20. The Control Electronics 108 also includes a Gate Pulse Generator 124, operated by a Gating Photocell 126, to turn the Voltage Comparator 120 on or off as required. The operation of the Control and Measurement Electronics 108 will now be explained in detail.

The Light Signal Input represents the light transmitted by the slits 87 to the photomultiplier 94. The time-varying signal generated by the photomultiplier 94 enters the Control and Measurement Electronics 108 going to the Tuned Amplifier 110 and also to the Low Pass Servo Amplifier 112 that controls the High-Voltage Supply 114 for the photomultiplier 94. Using techniques known to the electronic arts, the Low Pass Servo Amplifier 112 continuously compares the average (integrated) signal from the photomultiplier 94 with a predetermined reference signal and adjusts the High-Voltage Supply 114 so as to maintain the average signal equal to the reference signal. The average is taken by integrating the signal over a period of time long compared to the period of the fundamental signal frequency (see below), but very short compared with the time to scan a zonal band on the mirror 16. This arrangement makes the evaluation of the mirror 16 by the control system independent of such factors as its reflectivity and minor misalignments of it in the test station 12 and of changes in the incandescent lamp 60 and the electrical supply, etc. A High-Voltage Reference Control 116 permits an operator to change the reference signal as required.

The Tuned Amplifier 110 filters out all but a band of frequencies centered about the fundamental signal frequency (the number of radial slits 87 multiplied by the rotational speed of the chopper wheel 86) which it amplifies and sends to the AC to DC Converter 118. The AC to DC Converter 118 transmits a DC voltage proportional to the periodic amplitude of signal (i.e., the amplitude of its AC component) to the Voltage Comparator 120. The Voltage Comparator 120 compares the incoming voltage from the AC to DC Converter 118 with an internal voltage standard controlled by the Reference Level Control 122. When the incoming voltage is less than the internal voltage standard, i.e., the mirror under test deviates from flatness, as represented by the internal voltage standard, by more than a predetermined amount, the Voltage Comparator 120 actuates the Indicator Device 20 situate on the console 22 (see FIG. 1). Alternatively, the Voltage Comparator 120 could operate a device to mark the specific mirror in question or to remove it from the conveyer 14. The Reference Level Control 122 changes the internal voltage standard of the Voltage Comparator 120 as required to control the minimum mirror flatness quality which the apparatus 10 will accept. The operator can calibrate the apparatus 10 by testing a mirror known to have a flatness of minimum acceptable quality and adjusting the Reference Level Control 122 so any mirror of poorer quality will cause the Indicator Device 20 to reject it.

The Gating Photocell 124 and the Gate Pulse Generator 126 signal the Voltage Comparator 120 when an aperture 78 scans beyond the edge of the mirror 16. This prevents the Voltage Comparator 120 from erroneously rejecting a mirror due to a low signal when the light scans off the edge of the mirror 16 or from any other erroneous signal at the beginning and/or the end of a scan. The Gating Photocell 126 detects the passage of a mark or series of marks (not shown) on the chopper wheel 76. The marks are arranged at assembly so the Gating Photocell 126 and Gate Pulse Generator 124 interrupts the operation of the Voltage Comparator 120 when an aperture 78 scans beyond the edge of a mirror under test as indicated by the marks, but not when the aperture 78 scans the mirror itself.

The preceding description concerns that portion of the Control System which monitors the effect of a mirror 16 on an image of slit 68a. It will be understood that substantially the same arrangement can monitor the effect of the mirror on the images of the other slits. In the case of the overall curvature system, the Gating Photocell 126 and the Gate Pulse Generator 124 are eliminated because there is no scan; also, the Signal Tuned Amplifier 110 will amplify a fundamental signal frequency appropriate to that system. From the preceding description, one skilled in the art will be able to make the necessary alterations in the control circuitry. The various components, mentioned above, comprising the Control and Measurement Electronics 108 are well known to those skilled in the electronic arts.

It can be readily seen that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practiced in a manner than otherwise specifically described herein.

What is claimed is:

1. An apparatus comprising:
   a station for receiving a mirror whose surface topography is to be evaluated;
   a source plate having at least one transmitting aperture;
   lighting means, behind said source plate, for illuminating said transmitting aperture;
   a detecting station including a target plate having at least one receiving aperture;
   optical means, including said mirror, for forming an image of said transmitting aperture, using light emanating therefrom, at said receiving aperture; said optical means further including lens means to refract said light emanating from said transmitting aperture into a collimated beam incident on said mirror and to focus said collimated light after said mirror reflects said light to form an image of said transmitting aperture at said receiving aperture;
   photosensitive means, behind said target plate, for measuring the intensity of light from said transmitting aperture incident on said receiving aperture; and
   light chopping means to periodically interrupt the light reaching said photosensitive means.

2. An apparatus comprising:
   a station for receiving and aligning a mirror whose surface topography is to be evaluated;
   a first source plate having at least one slot permitting light to pass through;
   first illuminating means behind said first source plate;
   a condenser to collect light from said first illuminating means and direct it onto said first source plate;
   a first rotatable disk having a plurality of radially extending slots;
   first optical means, including said mirror, for forming an image of said first source plate slot on said first rotatable disk, said optical means including means for collimating light incident on said mirror from said first source plate slot into a first light beam having an area substantially equal to the area of said mirror;
   a first light-detecting means, having at least one photosensitive element, positioned to receive light passing through said radially extending slots in said first rotatable disk, for generating a time-varying first signal proportional to the amount of light it receives at any instant;
   a second source plate having at least one slot permitting light to pass through;
   second illuminating means behind said second source plate;
   a condenser to collect light from said second illuminating means and direct it onto said second source plate;
   a second rotatable disk having a plurality of radially extending slots;
   second optical means, including said mirror, for forming an image of said second source plate slot on said second rotatable disk, said optical means including means for collimating light incident on said mirror from said second source plate slot into a second light beam;
   means for limiting said second light beam to an area substantially less than the area of said mirror at said mirror;
   scanning means for moving said second light beam across the surface of said mirror in a predetermined pattern;
   second light-detecting means, having at least one photosensitive element positioned to receive light passing through said radially extending slots in said second rotatable disk, for generating a time-varying second signal proportional to the amount of light it receives at any instant; and
   signal processing means for receiving said first and second signals generated by said first and second light-detecting means and comparing them with a reference signal to determine if said surface of said mirror is within precalibrated limits.

3. The apparatus of claim 2, wherein at least one of said source plates has a pair of orthogonal slots and wherein the corresponding detecting means has a pair of photosensitive elements, each of said pair of photosensitive elements positioned to receive light from a specific one of said pair of orthogonal slots.

4. The apparatus of claim 2, wherein said scanning means comprises a Nipkow disk.

5. The apparatus of claim 2, further comprising:
   first signal averaging means for determining an average first signal from said first light-detecting means over a period of time that is long compared to the period of the fundamental frequency of said first signal but short compared to the period of observation of said mirror; and
   second signal averaging means for determining an average second signal from said second light-detecting means over a period of time that is long compared to the first period of the fundamental frequency of said second signal but short compared to the period of observation of said mirror.

6. The apparatus of claim 2, wherein said signal processing means includes means to maintain said average first and second signals from said first and said second signal averaging means each at a predetermined magnitude despite variations in the reflectivity of said mirror and its alignment at said station.

7. The apparatus of claim 6, wherein said light-detecting means each comprise a photomultiplier and said signal processing means comprises:
   means for generating a predetermined signal to compare said average signal with;
   a high-voltage supply for each said photomultiplier; and
   means for controlling each said high-voltage supply, so as to maintain said average signal, by comparing said average signal from its respective photomultiplier with said predetermined signal.

8. The apparatus of claim 6, further comprising:
   means for receiving and amplifying said signal from said light-detecting means;
   means for monitoring said signal after it is amplified and for generating a DC voltage proportional to the periodic amplitude of said signals generated by said each light detecting means;

means for furnishing a predetermined reference voltage; and means for comparing said DC voltage with said predetermined reference voltage.

9. The apparatus of claim 8, further comprising:

means for synchronizing the operation of said signal processing means with said scanning means.

10. The apparatus of claim 6, wherein said means for controlling each said high-voltage supply comprises a low-pass servo amplifier.

11. The apparatus of claim 8, wherein:

said means for receiving and amplifying said signal comprises a tuned amplifier;

said means for generating a DC voltage proportional to the difference between maximum and minimum signals generated by each light-detecting means comprises an AC to DC converter; and said means for comparing said DC voltage with said predetermined voltage comprises a voltage comparator.

12. An apparatus comprising:

a station for receiving a mirror whose surface topography is to be evaluated;

a source plate having at least one transmitting aperture;

lighting means, behind said source plate, for illuminating said transmitting aperture;

a detecting station including a target plate having at least one receiving aperture and further including light chopping means to periodically interrupt the light passing through said receiving aperture;

optical means including said mirror for forming an image of said transmitting aperture, using light emanating therefrom at said receiving aperture, and further including means for collimating light incident on said mirror;

zone means for limiting in a variable manner the size of a light beam incident on said mirror to a fraction of the area of said mirror, said zone means further including means for causing the limited size light beam to scan the total area of said mirror and means for varying the size of said beam in relation to the specified areas of said mirror being scanned; and photosensitive means, behind said target plate, for measuring the intensity of light from said transmitting aperture incident on said receiving aperture.

13. The apparatus of claim 12, further comprising:

processing means, for evaluating the light measurements made by said photosensitive means and for determining if said measurements indicate that said surface of said mirror is within precalibrated limits; and indicator means for distinguishing certain mirrors.

14. A method for testing a mirror wherein the blur of an image formed by said mirror is indicative of said mirror's quality, comprising the steps of:

positioning a first aperture;

illuminating said first aperture;

collimating light emanation from said first aperture;

limiting the cross-section of said collimated light to a size less than the area of said mirror;

scanning said limited collimated light across said mirror;

changing the cross-section of said collimated light while scanning it across said mirror;

reflecting said collimated light from said mirror forming an image of said first aperture with said collimated light reflected from said mirror at an image plane;

positioning a second aperture of predetermined cross-section at said image plane to limit the size of said image transmitted through said second aperture;

chopping said image transmitted through said second aperture;

receiving the light forming said image transmitted through said second aperture on a photosensitive element;

generating an electrical signal through means of said photosensitive element, periodic amplitude of said electrical signal related to the flatness of said mirror; and comparing said periodic amplitude to a reference amplitude.

* * * * *